United States Patent
Kang et al.

(10) Patent No.: US 10,521,035 B2
(45) Date of Patent: Dec. 31, 2019

(54) DRIVING CIRCUIT AND TOUCH DISPLAY DEVICE

(71) Applicant: LG Display Co., Ltd., Seoul (KR)

(72) Inventors: HyeongWon Kang, Seoul (KR); Beom-Jin Kim, Seoul (KR); HongJu Lee, Paju-si (KR)

(73) Assignee: LG Display Co., Ltd., Seoul (KR)

(*) Notice: Subject to any disclaimer, the term of this patent is extended or adjusted under 35 U.S.C. 154(b) by 16 days.

(21) Appl. No.: 15/793,612

(22) Filed: Oct. 25, 2017

(65) Prior Publication Data

US 2018/0120991 A1    May 3, 2018

(30) Foreign Application Priority Data

Oct. 31, 2016 (KR) .................. 10-2016-0143752

(51) Int. Cl.
| | |
|---|---|
| *G06F 3/045* | (2006.01) |
| *G06F 3/041* | (2006.01) |
| *G06F 3/047* | (2006.01) |
| *G06F 3/044* | (2006.01) |

(52) U.S. Cl.
CPC ............ *G06F 3/0412* (2013.01); *G06F 3/047* (2013.01); *G06F 3/044* (2013.01); *G06F 2203/04112* (2013.01)

(58) Field of Classification Search
USPC ............. 345/156, 173, 174, 215, 82, 175; 341/150; 324/677, 684
See application file for complete search history.

(56) References Cited

U.S. PATENT DOCUMENTS

| | | | |
|---|---|---|---|
| 2006/0015272 A1 | 1/2006 | Giraldo et al. | |
| 2006/0209039 A1 | 9/2006 | Destura et al. | |
| 2007/0285365 A1 | 12/2007 | Lee | |
| 2008/0174463 A1* | 7/2008 | Daito | G09G 3/3688 |
| | | | 341/150 |

(Continued)

FOREIGN PATENT DOCUMENTS

| | | |
|---|---|---|
| TW | 201413682 A | 4/2014 |
| TW | 201423702 A | 6/2014 |
| TW | 201601136 A | 1/2016 |

OTHER PUBLICATIONS

Partial European Search Report, dated Feb. 22, 2018, for European Application No. 17199142.5-1209, 17 pages.

*Primary Examiner* — Thuy N Pardo

(74) *Attorney, Agent, or Firm* — Seed IP Law Group LLP

(57) ABSTRACT

A touch display device and a driving circuit are disclosed in which the driving circuit is included in the touch display device. The driving circuit may be capable of reducing a chip size and power consumption by configuring an amplifier disposed in an output terminal of a data voltage to be electrically coupled with a feedback capacitor through a switch, and enabling both display driving and touch sensing to be performed through ON/OFF control of the switch. Further, the accuracy and performance of touch sensing may be improved by adjusting an ON/OFF operation of a switch and the number of amplifiers electrically coupled with the feedback capacitor, and a circuit structure for touch driving may be further simplified by generating a load-free driving voltage output in a touch driving period using the amplifiers and a digital-to-analog converter within the driving circuit.

19 Claims, 13 Drawing Sheets

(56) References Cited

U.S. PATENT DOCUMENTS

| | | | |
|---|---|---|---|
| 2012/0161794 A1* | 6/2012 | Ningrat | G06F 3/0418 |
| | | | 324/677 |
| 2013/0050292 A1 | 2/2013 | Mizukoshi | |
| 2013/0222335 A1* | 8/2013 | Lee | G11C 27/024 |
| | | | 345/174 |
| 2014/0035601 A1* | 2/2014 | Fujiyoshi | G01R 35/00 |
| | | | 324/684 |
| 2014/0285472 A1* | 9/2014 | Raynor | G06F 3/0416 |
| | | | 345/175 |
| 2015/0177885 A1 | 6/2015 | Noto | |
| 2015/0332630 A1* | 11/2015 | Chang | G09G 3/3291 |
| | | | 345/215 |
| 2016/0125796 A1 | 5/2016 | Ohara et al. | |
| 2016/0179249 A1* | 6/2016 | Ballan | G06F 3/0416 |
| | | | 345/174 |
| 2016/0188115 A1 | 6/2016 | Seo | |
| 2018/0082638 A1* | 3/2018 | Shaeffer | G09G 3/2011 |
| | | | 345/82 |

\* cited by examiner

DRIVING CIRCUIT AND TOUCH DISPLAY DEVICE

CROSS REFERENCE TO RELATED APPLICATION

This application claims priority from Korean Patent Application No. 10-2016-0143752, filed on Oct. 31, 2016, which is hereby incorporated by reference for all purposes as if fully set forth herein.

BACKGROUND

Technical Field

The present embodiments relate to a touch display device and a driving circuit included in the touch display device.

Description of the Related Art

As the information society develops, various demands for a display device that displays an image are increasing, and various types of display devices, such as a liquid crystal display device, a plasma display device, and an organic light emitting display device, have come to be utilized.

These display devices have recently been provided with a touch sensing function for recognizing a user's touch on a display panel and performing input processing in response to the recognized touch, for the convenience of the user using the display devices and in order to provide various functions.

The touch display device providing such a touch sensing function provides both a display function and a touch sensing function through a display panel. Accordingly, a data driving circuit that drives a data line disposed on the display panel, a touch electrode disposed in the display panel, and a touch driving circuit that drives a touch sensing line are disposed in the touch display device.

Therefore, there is a problem that the chip size and the power consumption are increased by the driving circuit disposed for performing each of the display function and the touch sensing function, and there are many difficulties in designing driving circuits and a channel of each driving circuit in a small-sized display device, such as a mobile display device.

BRIEF SUMMARY

The aspect of the present embodiments is to minimize an increase in the size of a driving circuit in a touch display device, and to provide a driving circuit capable of performing display driving and touch driving in a touch display device that includes the driving circuit.

The aspect of the present embodiments is to provide a touch display device and a driving circuit that can reduce the noise of touch sensing data sensed by the driving circuit that performs display driving and touch driving, and improve the accuracy of the touch sensing data.

The aspect of the present embodiments is to provide a driving circuit that can generate a load-free driving voltage within the driving circuit, without separately arranging a circuit for generating a load-free driving voltage that is output during a touch driving period in a touch display device.

In an aspect, the present embodiment provide a touch display device including: a touch display panel in which a plurality of gate lines and a plurality of data lines are arranged, a plurality of subpixels are arranged in an area where the gate lines and the data lines intersect, a plurality of touch electrodes are arranged, and a plurality of touch sensing lines electrically coupled with the touch electrodes are arranged; and a driving circuit that drives the data lines in a display driving period and drives the touch sensing lines in a touch driving period.

The driving circuit of the touch display device includes a plurality of amplifiers having an input terminal electrically coupled with an output terminal for outputting an analog voltage, and an output terminal electrically coupled with the data lines.

Further, at least one amplifier of the plurality of amplifiers in the driving circuit is electrically coupled with a feedback capacitor electrically coupled with at least one of the touch sensing lines through a switch turned on in the touch driving period.

The amplifier electrically coupled with the feedback capacitor outputs a data voltage in the display driving period, and outputs touch sensing signals input through the touch sensing lines in the touch driving period.

The plurality of amplifiers included in the driving circuit may have a structure in which N adjacent amplifiers constitute one group and one of the N amplifiers included in the group is electrically coupled with the feedback capacitor.

Alternatively, the plurality of amplifiers may have a structure in which N adjacent amplifiers constitute one group, and the N amplifiers included in the group are electrically coupled with the feedback capacitor through one or more switches that electrically coupled with the feedback capacitor and are turned on in the touch driving period. And the one or more switches are electrically coupled with respective amplifiers.

In a structure where all of the N amplifiers included in the group may be electrically coupled with the feedback capacitor, the N amplifiers may be sequentially electrically coupled with the feedback capacitor in the touch driving period.

Alternatively, the N amplifiers may be concurrently electrically coupled with the feedback capacitor in the touch driving period.

The described driving circuit may include a first amplifier having an input terminal to which a first voltage is input, and a second amplifier having an input terminal to which a second voltage is input, wherein a load-free driving voltage that is output in the touch driving period may be generated using voltage output from the first amplifier and voltage output from the second amplifier.

The load-free driving voltage generated within the driving circuit may be applied to input terminals of the plurality of amplifiers included in the driving circuit in the touch driving period.

In another aspect, the present embodiments provide a driving circuit including: an analog voltage output unit that receives an input of a digital signal and outputs an analog voltage; a plurality of amplifiers having input terminals electrically coupled with an output terminal of the analog voltage output unit, and output terminals electrically coupled with data lines arranged in a touch display panel; and a feedback capacitor electrically coupled with touch sensing lines arranged in the touch display panel, and electrically coupled with at least one amplifier among the plurality of amplifiers through a switch turned on in a touch driving period.

The driving circuit may further include a load-free driving voltage generation unit including: a first amplifier that is electrically coupled with the output terminal of the analog voltage output unit and has a first voltage input thereto; and a second amplifier that is electrically coupled with the output terminal of the analog voltage output unit and has a second voltage input thereto, wherein a load-free driving voltage that is output in the touch driving period is generated using voltage output from the first amplifier and voltage output from the second amplifier.

According to the present embodiment, it is possible to reduce a chip size and provide a driving circuit capable of performing display driving and touch driving and a touch display device including the same, by using a channel that drives a data line in a driving circuit, as a channel capable of receiving a touch sensing signal.

According to the present embodiments, it is possible to reduce noise of touch sensing data and increase the accuracy of the touch sensing data, by using a plurality of channels within a driving circuit, as channels for receiving touch sensing signals either concurrently or sequentially.

According to the present embodiments, a circuit for generating a load-free driving voltage that is output in a touch driving period can be internalized in a driving circuit, without separately arranging the same, by generating a load-free driving voltage using an amplifier and configuration for outputting an analog voltage within the driving circuit.

BRIEF DESCRIPTION OF THE DRAWINGS

The above and other objects, features and advantages of the present disclosure will be more apparent from the following detailed description taken in conjunction with the accompanying drawings, in which.

DETAILED DESCRIPTION

Figure 1:
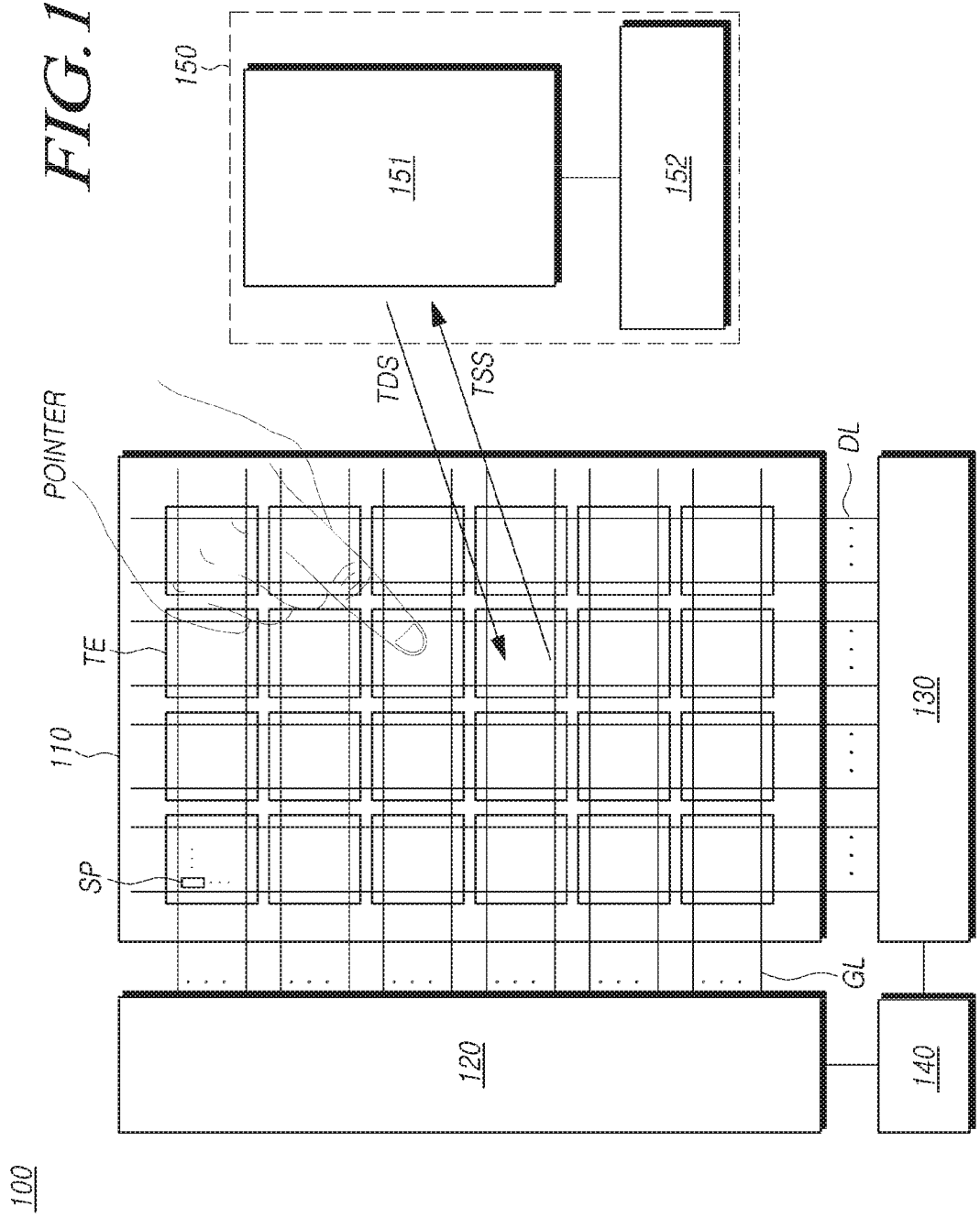
FIG. 1 is a diagram illustrating a schematic configuration of a touch display device according to the present embodiments.

Hereinafter, some embodiments of the present disclosure will be described in detail with reference to the accompanying illustrative drawings. In designating elements of the drawings by reference numerals, the same elements will be designated by the same reference numerals even when they are shown in different drawings. Further, in the following description of the present disclosure, a detailed description of known functions and configurations incorporated herein will be omitted when it may make the subject matter of the present disclosure rather unclear.

In addition, terms, such as first, second, A, B, (a), (b) or the like may be used herein when describing components of the present disclosure. These terms are merely used to distinguish one component from other components, and the properties, order, sequence and the like of the corresponding component are not limited by the corresponding term. In the case where it is described that a certain structural element "is connected to", "is coupled to", or "is in contact with" another structural element, it should be interpreted that another structural element may "be connected to", "be coupled to", or "be in contact with" the structural elements as well as that the certain structural element is directly connected to or is in direct contact with another structural element.

FIG. 1 illustrates a schematic configuration of a touch display device 100 according to the present embodiments.

Referring to FIG. 1, the touch display device 100 according to the present embodiments may perform a display function for displaying an image and a touch sensing function for sensing a touch by a pointer, such as a finger or a pen.

The touch display device 100 according to the present embodiments may function in a display mode during a display driving period for the display function, or may function in a touch mode during a touch driving period for the touch sensing function.

The display driving period and the touch driving period may be temporally separated, or may partially or completely temporally coincide or overlap.

As such, a display mode operation for image display and a touch mode operation for touch sensing may be performed separately, or the display mode operation for image display and the touch mode operation for touch sensing may be performed together.

In order to perform two functions (the display function and the touch sensing function), the touch display device 100 according to the present embodiments may include a touch display panel 110 in which a plurality of subpixels SP defined by a plurality of gate lines GL and a plurality of data lines DL, and a plurality of touch electrodes TE are arranged.

Further, the touch display device 100 may include, for the display function, a gate driving circuit 120, a data driving circuit 130, a controller 140, etc., which drive the touch display panel 110.

Further, the touch display device 100 may include a touch driving circuit 150 which drives the touch display panel 110, for the touch sensing function.

The gate driving circuit 120 may drive the plurality of gate lines GL during the display driving period, and the data driving circuit 130 may drive the plurality of data lines DL during the display driving period.

The controller 140 may control the operation timing of the gate driving circuit 120 and the operation and/or timing of one or more of the gate driving circuit 120 and the data driving circuit 130, and may control the supply of power.

The touch driving circuit 150 may apply a touch driving signal TDS to at least one touch electrode TE among the plurality of touch electrodes TE during the touch driving period, and detects at least one of the presence or absence of a touch and a touch position based on a touch sensing signal TSS detected through each touch electrode TE to which the touch driving signal TDS is applied.

The touch driving circuit 150 may apply a touch driving signal TDS to at least one touch electrode TE among the plurality of touch electrodes TE during the touch driving period, and detects at least one of the presence or absence of a touch and a touch position based on a touch sensing signal TSS detected through each touch electrode TE to which the touch driving signal TDS is applied.

In order to drive the plurality of touch electrodes TE, the sensing unit 151 may supply the touch driving signals TDS to the plurality of touch electrodes TE, and receive touch sensing signals TSS from the respective touch electrodes TE to which the touch driving signals TDS are supplied.

The sensing unit 151 may transfer the received touch sensing signals TSS or sensing data obtained by processing the touch sensing signals TSS to the touch processor 152.

The touch processor 152 may execute a touch algorithm using the touch sensing signals TSS or the sensing data, and determine the presence or absence of a touch and a touch position through the execution of the touch algorithm.

In some implementations, the gate driving circuit 120, the data driving circuit 130, the touch driving circuit 150, etc., which are described above, may be separately implemented in distinct components. However, in other implementations, two or more of the gate driving circuit 120, the data driving circuit 130, and the touch driving circuit 150 may be integrated and implemented within a single component.

Figure 2:
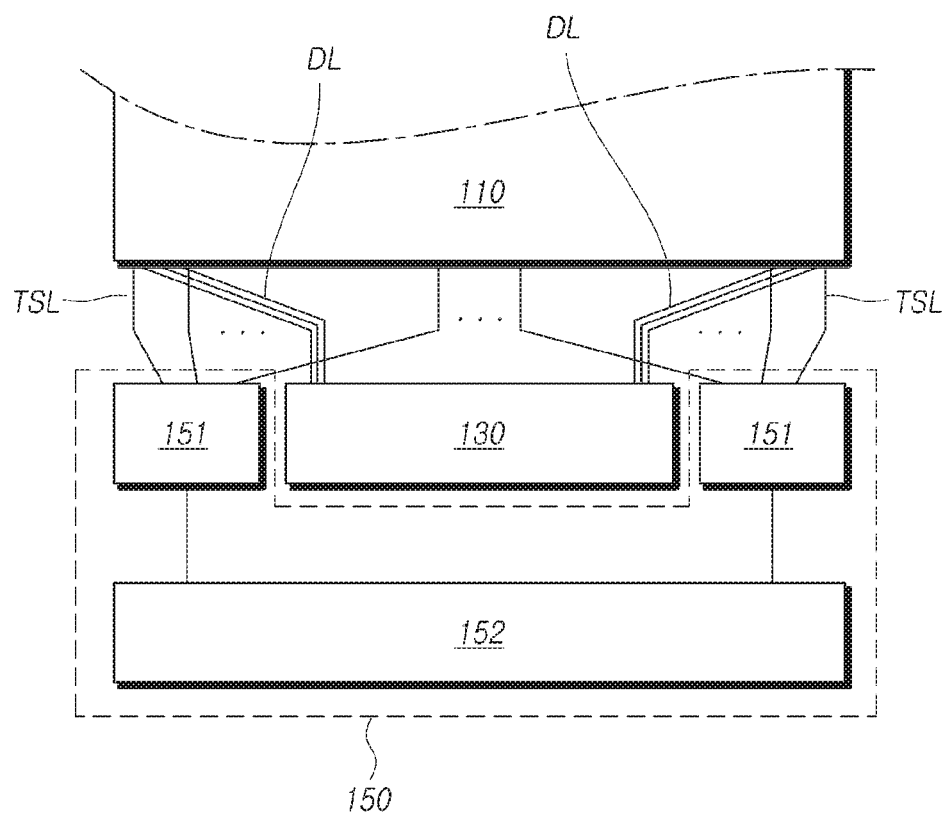
FIG. 2 is a diagram illustrating an example of a driving circuit structure in a touch display device according to the present embodiments.

FIG. 2 illustrates an example of a structure in which the sensing unit 151 and the touch processor 152 of the touch driving circuit 150 are arranged in the touch display device 100.

Referring to FIG. 2, the data driving circuit 130 and the touch driving circuit 150 may be arranged on a printed circuit substrate or a flexible printed circuit substrate.

The data driving circuit 130 may electrically couple with subpixels SP arranged in the touch display panel 110 through the data lines DL.

The data driving circuit 130 may convert image data that is input from the controller 140 into an analog voltage, and then supply the analog voltage to the subpixels SP through the data lines DL in accordance with timing at which scan signals are applied to the respective subpixels SP, so that each of the subpixels SP expresses gradation according to the image data.

The data driving circuit 130 may include a digital-to-analog converter DAC that converts a digital signal input from the controller 140 into an analog voltage, and a plurality of amplifiers that amplify a data voltage output from the digital-to-analog converter DAC.

The plurality of amplifiers included in the data driving circuit 130 electrically couple with the respective data lines DL, and may amplify and output the data voltage applied to the data lines DL.

The touch driving circuit 150 may include the sensing unit 151 and the touch processor 152, as described above.

For example, there may be two sensing units 151 disposed on both sides of the data driving circuit 130.

The sensing units 151 electrically couple with the plurality of touch electrodes TE arranged in the touch display panel 110 through touch sensing lines TSL.

The sensing units 151 apply touch driving signals TDS to the respective touch electrodes TE through touch sensing lines TSL in a touch driving period, and receive touch sensing signals TSS from the touch electrodes TE to which the touch driving signals TDS are applied.

Further, the sensing units 151 transfer the received touch sensing signals TSS or touch sensing data generated by processing the touch sensing signals TSS to the touch processor 152, and enable the touch processor 152 to determine the presence or absence of a touch, a touch position, and the like.

In some implementations, display driving by the data driving circuit 130 and touch driving by the touch driving circuit 150 may be concurrently performed, partially or completely, but in other implementations, the display driving and the touch driving may be performed in a display driving period and a touch driving period, respectively, which are divided and separated in time.

In particular, when a common electrode to which a common voltage is applied in the display driving period is used as the touch electrode TE, the display driving period and the touch driving period may be divided in time.

Therefore, the touch display device 100 according to the present embodiments provide a driving circuit capable of reducing a chip size and power consumption and performing display driving and touch driving, by enabling touch sensing using an internal configuration of the data driving circuit 130.

Figure 3A:
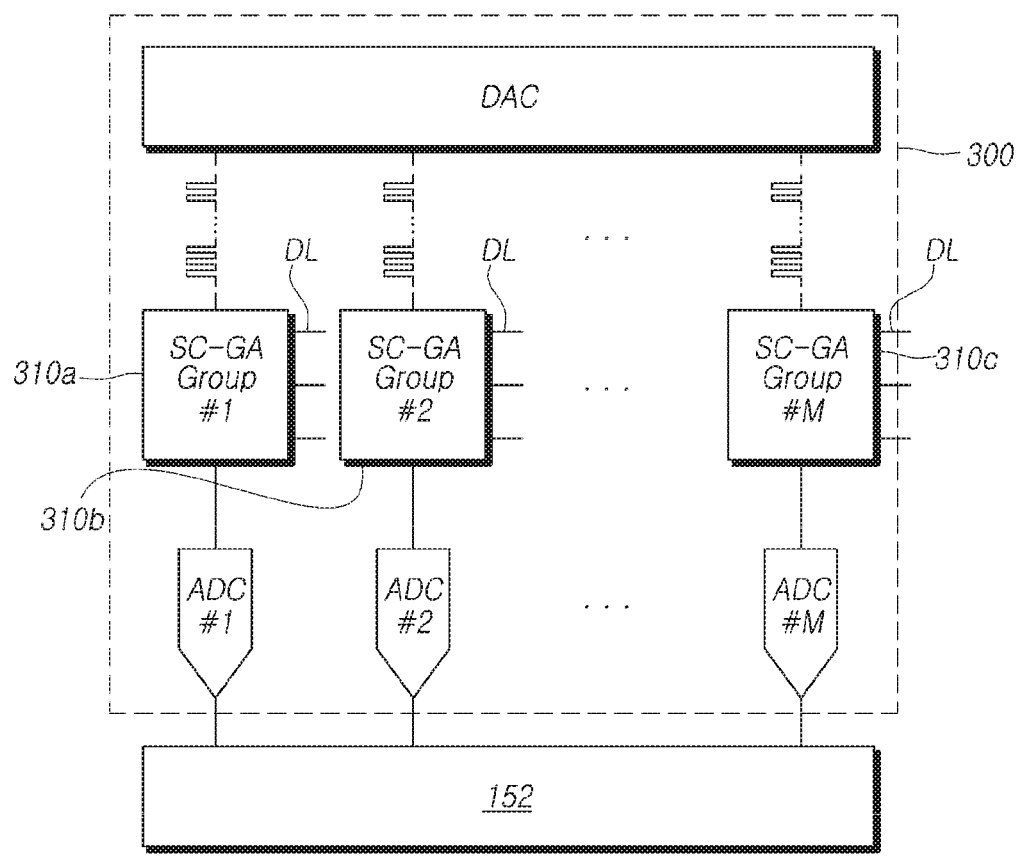
FIG. 3A and FIG. 3B are diagrams illustrating schematic configurations of a driving circuit capable of performing display driving and touch driving in a touch display device according to the present embodiments.
Figure 3B:
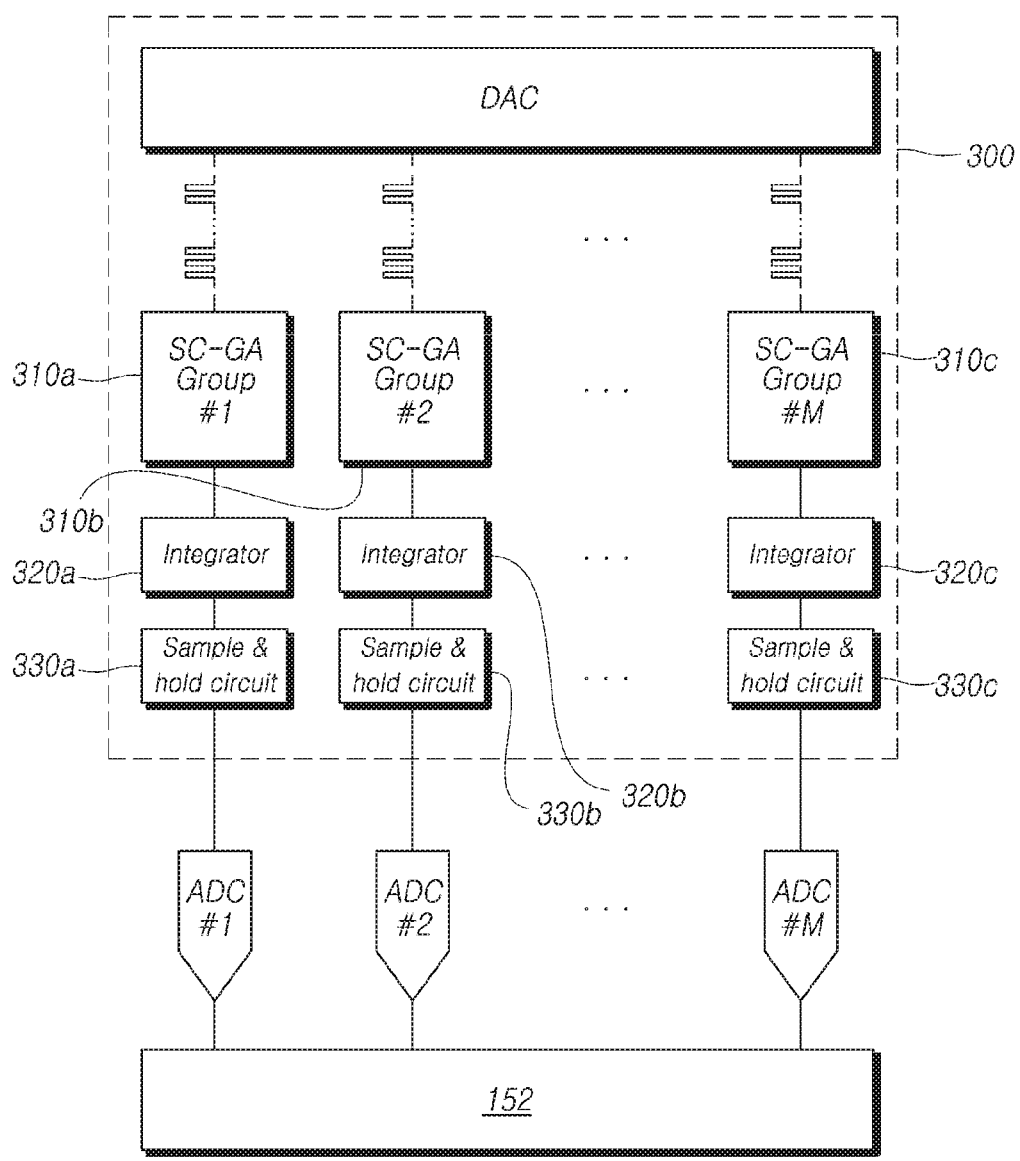

FIG. 3A and FIG. 3B illustrate schematic configurations of a driving circuit 300 capable of performing both display driving and touch driving in the touch display device 100 according to the present embodiments.

Referring to FIG. 3A, in the touch display device 100 according to the present embodiments, a driving circuit 300 may include a digital-to-analog converter DAC that converts a digital signal into an analog voltage, a plurality of switched capacitor gain amplifier groups SC-GA Group 310, which includes 310a, 310b, 310c, collectively, "SC-GA Group 310") to which voltage that is output from the digital-to-analog converter DAC is input, and an analog-to-digital converter ADC electrically coupled with each of the switched capacitor gain amplifier groups SC-GA Group 310.

The digital-to-analog converter DAC may convert image data input from the controller 140 into an analog voltage and then output the analog voltage in a display driving period.

The digital-to-analog converter DAC may output a load-free driving voltage which is internally generated or received from the outside in a touch driving period.

The switched capacitor gain amplifier group SC-GA Group 310 may include a plurality of amplifiers, input terminals of the respective amplifiers being electrically coupled with an output terminal of the digital-to-analog converter DAC and output terminals of the respective amplifiers being electrically coupled with the data lines DL.

As such, in the display driving period, a data voltage that is output from the digital-to-analog converter DAC may be amplified by the amplifiers included in the switched capacitor gain amplifier group SC-GA Group 310, and may then be applied to the respective data lines DL.

Further, the switched capacitor gain amplifier group SC-GA Group 310 may include a feedback capacitor Cfb (FIG. 4) electrically coupled with a touch sensing line TSL.

The feedback capacitor Cfb may be electrically coupled with at least one amplifier among the amplifiers included in the switched capacitor gain amplifier group SC-GA Group 310 through a switch.

In such an implementation, the plurality of amplifiers included in the switched capacitor gain amplifier group SC-GA Group 310 may form channels with the respective data lines DL in the display driving period. However, fewer channels may be required in the touch driving period than the number of channels required in the display driving period, and every N amplifier thus constitutes one switched capacitor gain amplifier group SC-GA Group 310.

Further, the driving circuit 300 enables, by providing a structure in which an amplifier included in the switched capacitor gain amplifier group SC-GA Group 310 is electrically coupled with the feedback capacitor Cfb that is electrically coupled with a touch sensing line TSL, a received touch sensing signal TSS to be output through the amplifier in the touch driving period.

The touch sensing signal TSS that is output through the switched capacitor gain amplifier group SC-GA Group 310 in the touch driving period is transferred to the touch processor 152 through the analog-to-digital converter ADC, so that the touch processor 152 may determine the presence or absence of a touch, a touch position, and the like.

Therefore, according to the present embodiments, the plurality of amplifiers arranged for display driving form a group, and the feedback capacitor Cfb for touch sensing is provided to each group, thereby providing the driving circuit 300 capable of performing both display driving and touch driving.

Accordingly, the increase in a chip size and power consumption due to a configuration, in which the data driving circuit 130 and the touch driving circuit 150 are separately configured, is reduced.

In the driving circuit 300, a circuit configuration for touch sensing may be arranged between the switched capacitor gain amplifier group SC-GA Group 310 and the analog-to-digital converter ADC.

Referring to FIG. 3B, in the touch display device 100 according to the present embodiments, the driving circuit 300 may include a digital-to-analog converter DAC, switched capacitor gain amplifier groups SC-GA Group 310, and an analog-to-digital converter ADC, in which integrators 320a, 320b, and 320c and sample-and-hold circuits 330a, 330b and 330c may be arranged between the switched capacitor gain amplifier groups SC-GA Group 310 and the analog-to-digital converter ADC.

The integrators 320a, 320b, and 320c may integrate output signals output from amplifiers electrically coupled with touch sensing lines TSL through switches, among amplifiers arranged in the switched capacitor gain amplifier groups SC-GA Group 310, and then output integrated values.

The sample-and-hold circuits 330a, 330b and 330c may store the integrated values output from the integrators 320a, 320b, and 320c.

That is, the integrators 320a, 320b, and 320c may integrate and output the signals, which are output from the amplifiers arranged in the switched capacitor gain amplifier groups SC-GA Group 310, by a predetermined integral number of times in a touch driving period, and the sample-and-hold circuits 330a, 330b and 330c may sample and store the signals output from the integrators 320a, 320b, and 320c.

The analog-to-digital converter ADC may read the signals stored by the sample-and-hold circuits 330a, 330b and 330c, convert the read signals into sensing values corresponding to digital values, and output the sensing values to the touch processor 152.

The touch processor 152 determines the presence or absence of a touch and a touch position based on the sensing values transferred from the analog-to-digital converter ADC.

Hereinafter, a structure of the switched capacitor gain amplifier group SC-GA Group 310 capable of display driving and touch sensing in the driving circuit 300 will be described in detail.

Figure 4:
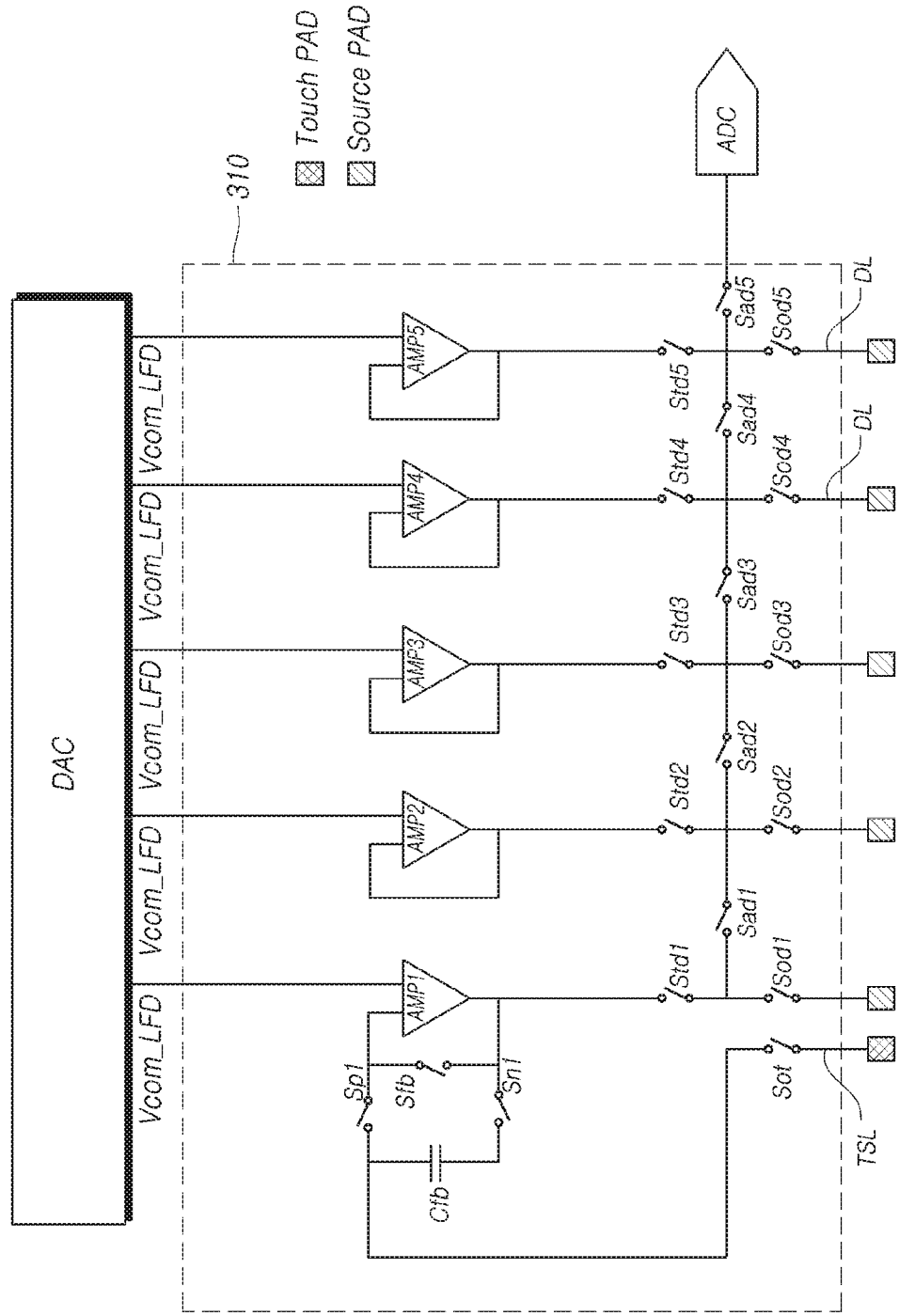
FIG. 4 is a diagram illustrating a first embodiment of a driving circuit structure that enables display driving and touch driving in a touch display device according to the present embodiments.

FIG. 4 illustrates a first embodiment of a structure of the driving circuit 300 in a touch display device 100 according to the present embodiments.

Referring to FIG. 4, an example of a structure of one of the plurality of switched capacitor gain amplifier groups SC-GA Group 310 included in the driving circuit 300 is shown.

The switched capacitor gain amplifier group SC-GA Group 310 may include a plurality of amplifiers having input terminals electrically coupled with the digital-to-analog converter DAC and output terminals electrically coupled with the data lines DL, and a feedback capacitor Cfb electrically coupled with a touch sensing line TSL.

The output terminals of the respective amplifiers may be electrically coupled with the data lines DL through switches that electrically couple to the output terminals in a display driving period, and may be electrically coupled with the analog-to-digital converter ADC in a touch driving period.

Specifically, switches Std1, Std2, Std3, Std4, and Std5, which control voltage output from the amplifiers or output of signals, are arranged in the output terminals of the respective amplifiers.

Further, switches Sad1, Sad2, Sad3, Sad4, and Sad5, which are electrically coupled between two types of the described switches and control the signals that are output from the amplifiers to be applied to the analog-to-digital converter ADC, are arranged.

One amplifier among the plurality of amplifiers is electrically coupled with the feedback capacitor Cfb that is electrically coupled with the touch sensing line TSL through switches Sp1 and Sn1 turned on during the touch driving period.

The feedback capacitor Cfb is electrically coupled with the touch sensing line TSL through a switch Sot turned on in the touch driving period.

Therefore, the analog voltage input to each of the amplifiers is amplified and applied to the data lines DL electrically coupled with the respective amplifiers in the display driving period.

Further, a touch sensing signal TSS received through the touch sensing line TSL in the touch driving period is amplified by the amplifier electrically coupled with the feedback capacitor Cfb and transferred to the analog-to-digital converter ADC.

Accordingly, it may be possible to provide the driving circuit in which a chip size and power consumption are reduced, by enabling display driving and touch sensing in each of the switched capacitor gain amplifier groups SC-GA Group 310 included in the driving circuit 300.

Hereinafter, a specific scheme, in which the driving circuit 300 according to the first embodiment operates in a display driving period and a touch driving period, will be described with reference to FIG. 5 and FIG. 6.

Figure 5:
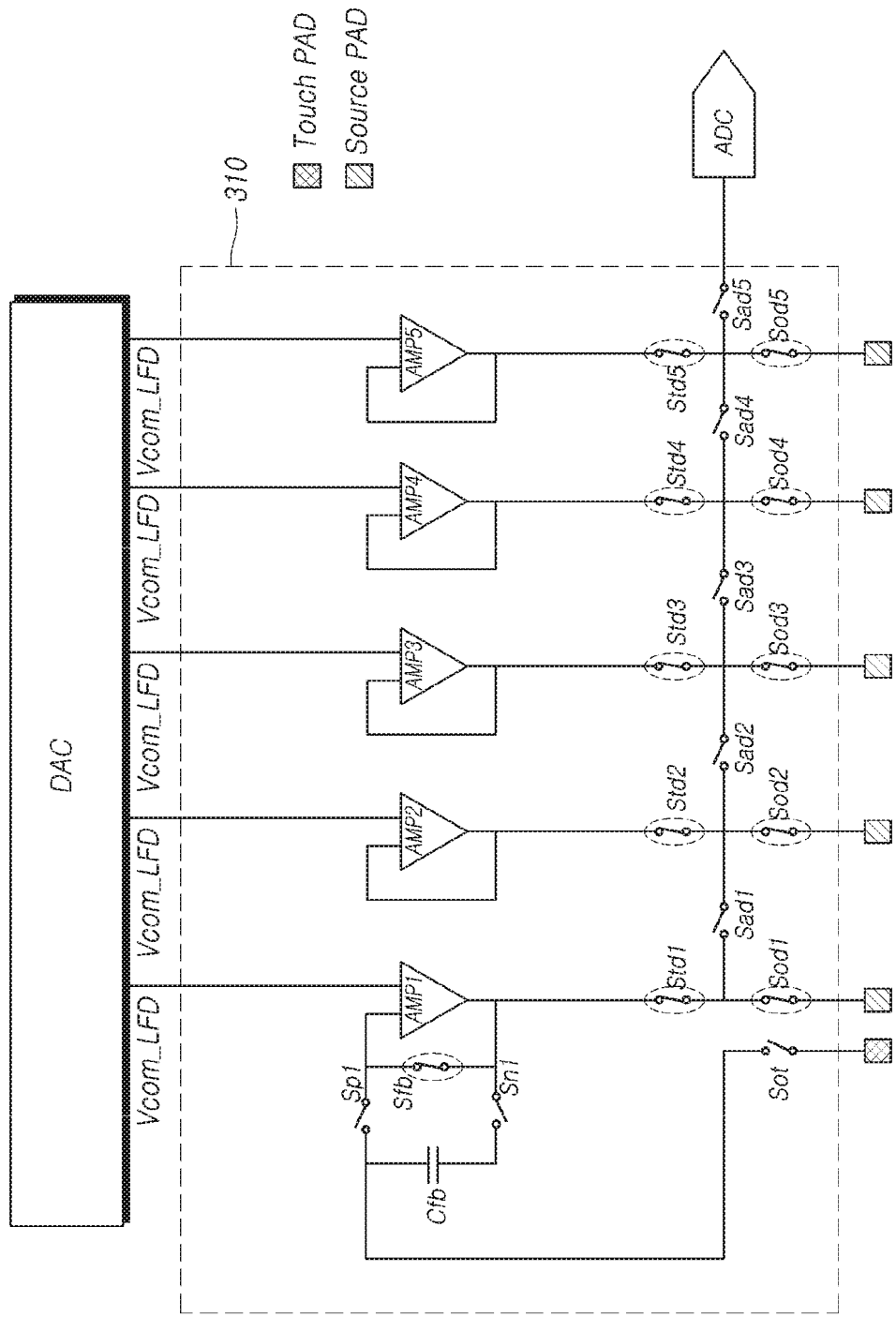
FIG. 5 is a diagram illustrating a state in which the driving circuit according to the first embodiment operates in a display driving period.

FIG. 5 illustrates a state in which a switched capacitor gain amplifier group SC-GA Group 310 of the driving circuit 300 according to the first embodiment operates in a display driving period.

Referring to FIG. 5, a switch Sfb electrically coupled with an amplifier that is electrically coupled with a feedback capacitor Cfb is turned on in the display driving period.

Further, all of switches Sod1, Sod2, Sod3, Sod4, and Sod5 and switches Std1, Std2, Std3, Std4, and Std5 that are electrically coupled with respective output terminals of amplifiers are turned on.

Further, all of the remaining switches are turned off.

Therefore, the data voltage that is output from the digital-to-analog converter DAC is applied to the data lines DL electrically coupled with the respective amplifiers through the amplifiers.

That is, the same operation as that of the data driving circuit 130 may be performed in the display driving period through ON/OFF control of the switches included in each switched capacitor gain amplifier group SC-GA Group 310.

Touch sensing may be performed in the touch driving period through ON/OFF control of the switches included in the switched capacitor gain amplifier group SC-GA Group 310.

Figure 6:
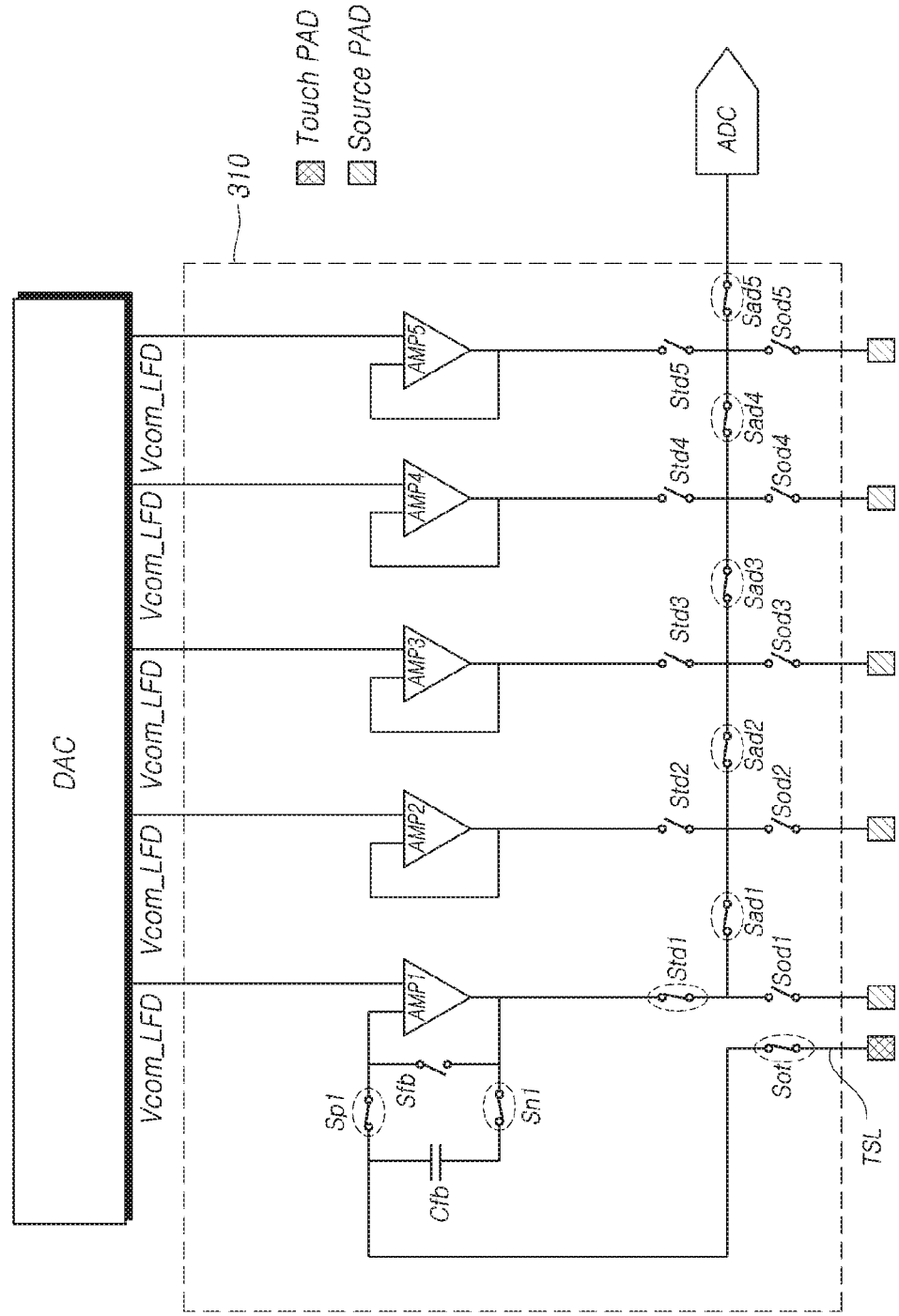
FIG. 6 is a diagram illustrating a state in which the driving circuit according to the first embodiment operates in a touch driving period.

FIG. 6 illustrates a state in which the switched capacitor gain amplifier group SC-GA Group of the driving circuit 300 operates in a touch driving period.

Referring to FIG. 6, switches Sp1 and Sn1 electrically coupling a feedback capacitor Cfb and an amplifier in the touch driving period are turned on, and a switch Sot controlling the electrical coupling between the feedback capacitor Cfb and a touch sensing line TSL is also turned on.

Accordingly, a touch sensing signal TSS received through the touch sensing line TSL is input to an input terminal of the amplifier electrically coupled with the feedback capacitor Cfb in the touch driving period.

Further, switches Std1 electrically coupled to the output terminal of the respective amplifier is turned on, and switches Sad1, Sad2, Sad3, Sad4, and Sad5 controlling the electrical coupling between the analog-to-digital converter ADC and the amplifiers are also turned on.

Further, a switch Sfb electrically coupled with the feedback capacitor Cfb dynamically operates to reset the feedback capacitor Cfb, and all of the remaining switches are turned off.

Therefore, the touch sensing signal TSS input to the input terminal of the amplifier that is electrically coupled with the feedback capacitor Cfb is transferred from the amplifier to the analog-to-digital converter ADC in the touch driving period.

According to the present embodiments, the touch sensing signal TSS may be received in the touch driving period by providing a structure in which N amplifiers outputting data voltages in the display driving period are included in a single group, and the feedback capacitor Cfb electrically coupled with the touch sensing line TSL is electrically coupled to one of the N amplifiers.

Accordingly, the chip size of the driving circuit 300 for performing display driving and touch driving may be reduced, and power consumption may also be reduced.

Meanwhile, as the size of the touch display device 100 increases, a resistance of a touch sensing line TSL disposed on the touch display panel 110 and a parasitic capacitance of a touch electrode TE increase, whereby the accuracy of touch sensing may decrease.

The driving circuit 300 of the touch display device 100 according to the present embodiments provides a structure enabling display driving and touch driving, and further, provides a driving scheme and a structure enabling the accuracy of touch sensing to be improved.

Figure 7:
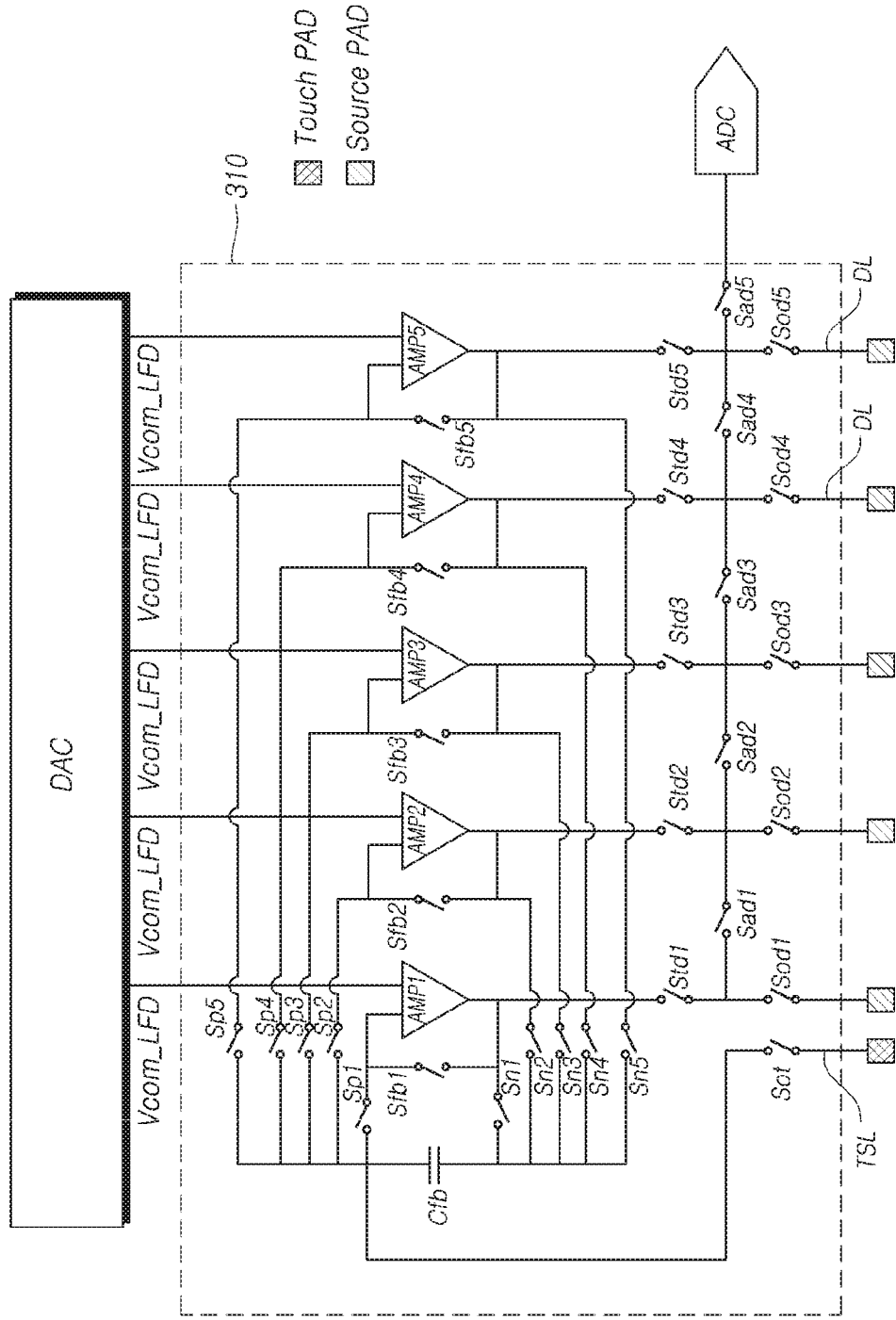
FIG. 7 is a diagram illustrating a second embodiment of a driving circuit structure enabling display driving and touch driving in a touch display device according to the present embodiments.

FIG. 7 illustrates a second embodiment of a structure of the driving circuit 300 in a touch display device 100 according to the present embodiments.

Referring to FIG. 7, in the driving circuit 300 according to the second embodiment, each switched capacitor gain amplifier group SC-GA Group 310 may include a plurality of amplifiers having input terminals electrically coupled with the digital-to-analog converter DAC and output terminals electrically coupled with the data lines DL, and a feedback capacitor Cfb electrically coupled with a touch sensing line TSL.

Further, output terminals of the respective amplifiers may be electrically coupled with the data lines DL through switches that electrically couple to the output terminals in a display driving period, and may be electrically coupled with the analog-to-digital converter ADC in a touch driving period.

At this time, the amplifiers included in one switched capacitor gain amplifier group SC-GA Group 310 have respective switches Sfb1, Sfb2, Sfb3, Sfb4, and Sfb5 electrically coupled thereto.

Further, each amplifier may be electrically coupled with the feedback capacitor Cfb disposed within the switched capacitor gain amplifier group SC-GA Group 310.

For example, an amplifier AMP1 may be electrically coupled with the feedback capacitor Cfb depending on ON/OFF states of switches sp1 and sn1, and an amplifier AMP2 may be electrically coupled with the feedback capacitor Cfb depending on ON/OFF states of switches sp2 and sn2.

Similarly, the remaining amplifiers AMP3, AMP4, and AMP5 may be electrically coupled with the feedback capacitor Cfb through respective switches Sp3 and Sn3, Sp4 and Sn4, and Sp5 and Sn5 electrically coupled thereto.

Therefore, due to controlling ON/OFF of the switches electrically coupled to the respective amplifiers, the amplifier electrically coupled with the feedback capacitor Cfb that is electrically coupled with the touch sensing line TSL in the touch driving period may be one or more.

Hereinafter, with reference to FIG. 8 to FIG. 10, a specific scheme in which the driving circuit 300 according to the second embodiment operates in a display driving period and a touch driving period will be described.

Figure 8:
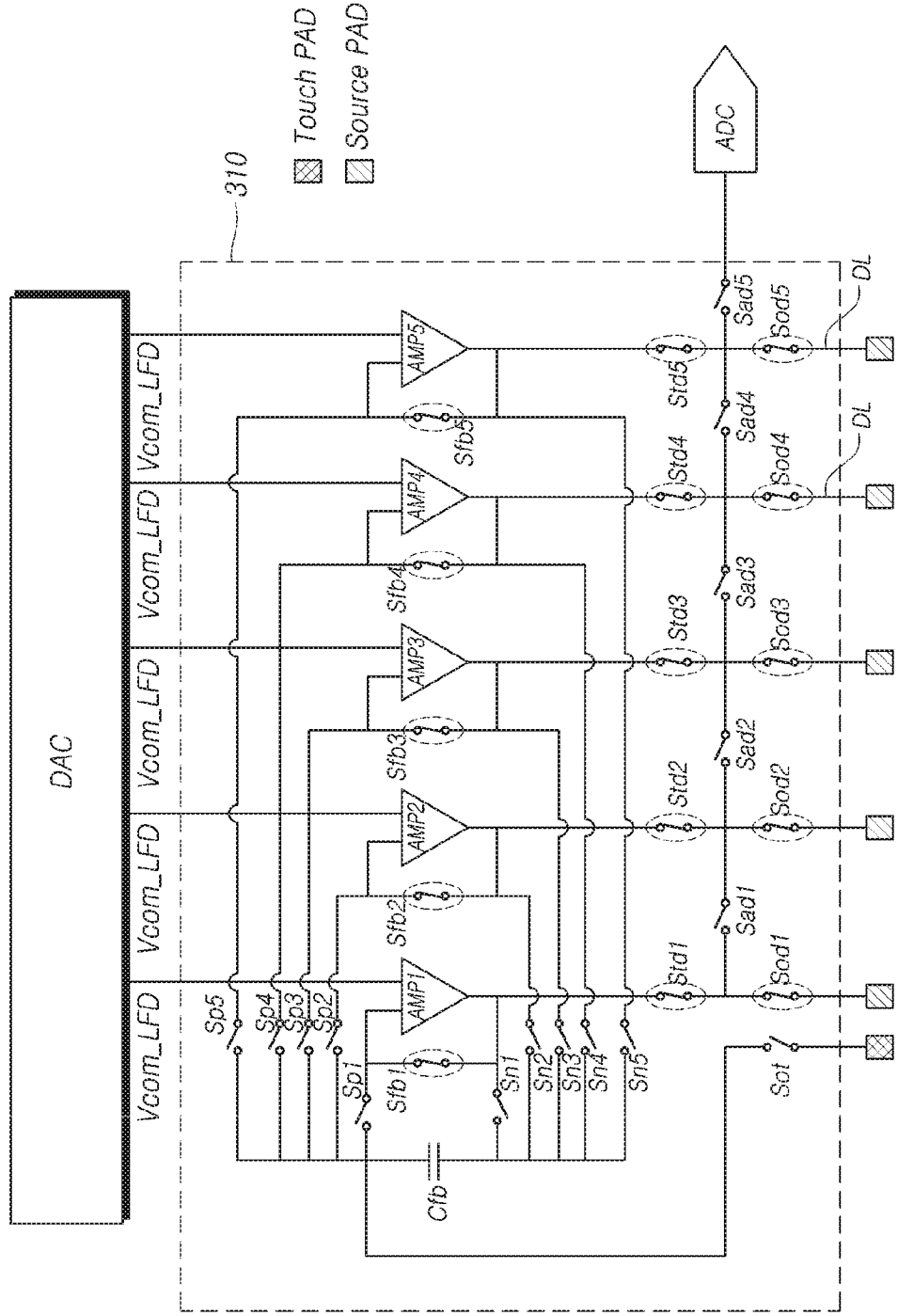
FIG. 8 is a diagram illustrating a state in which the driving circuit according to the second embodiment operates in a display driving period.

FIG. 8 illustrates a state in which a switched capacitor gain amplifier group SC-GA Group 310 of the driving circuit 300 according to the second embodiment operates in a display driving period.

Referring to FIG. 8, in the switched capacitor gain amplifier group SC-GA Group 310, switches Sfb1, Sfb2, Sfb3, Sfb4, and Sfb5 electrically coupled with respective amplifiers are turned on in the display driving period.

Further, switches Std1, Std2, Std3, Std4, and Std5 electrically coupled to output terminals of the amplifiers are turned on, and switches Sod1, Sod2, Sod3, Sod4, and Sod5 electrically coupled with the data lines DL are also turned on.

Further, all of the remaining switches are turned off.

In such a situation, the amplifiers arranged within the switched capacitor gain amplifier group SC-GA Group 310 output data voltages to the respective data lines DL in the display driving period.

In the switched capacitor gain amplifier group SC-GA Group 310, a touch sensing signal TSS may be transferred to the analog-to-digital converter ADC in a touch driving period, each of the amplifiers may be electrically coupled with the feedback capacitor Cfb, and the touch sensing signal TSS may thus be transferred to the analog-to-digital converter ADC using various schemes.

Figure 9A:
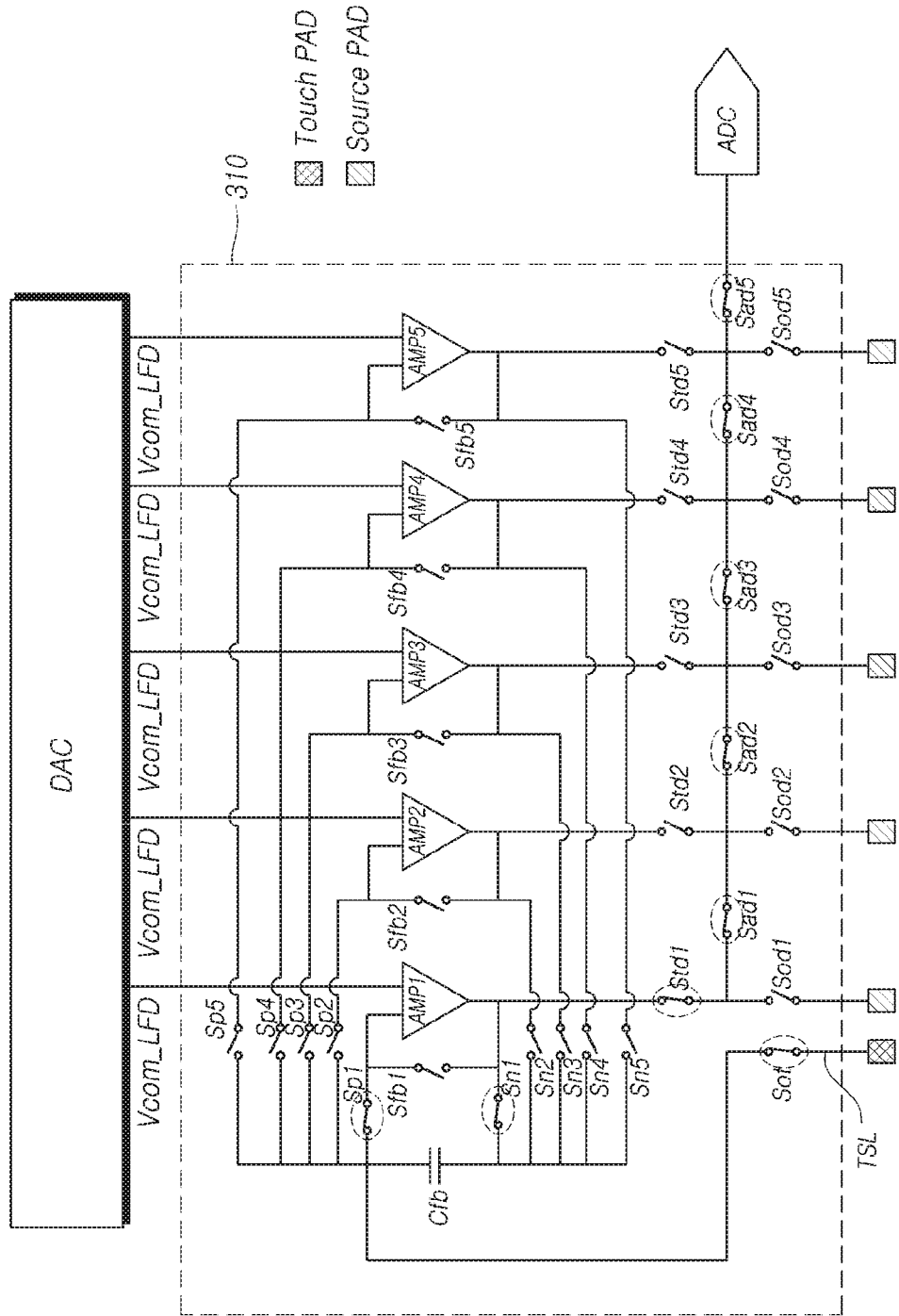
FIG. 9A and FIG. 9B are diagrams illustrating examples of a state in which the driving circuit according to the second embodiment operates in a touch driving period.
Figure 9B:
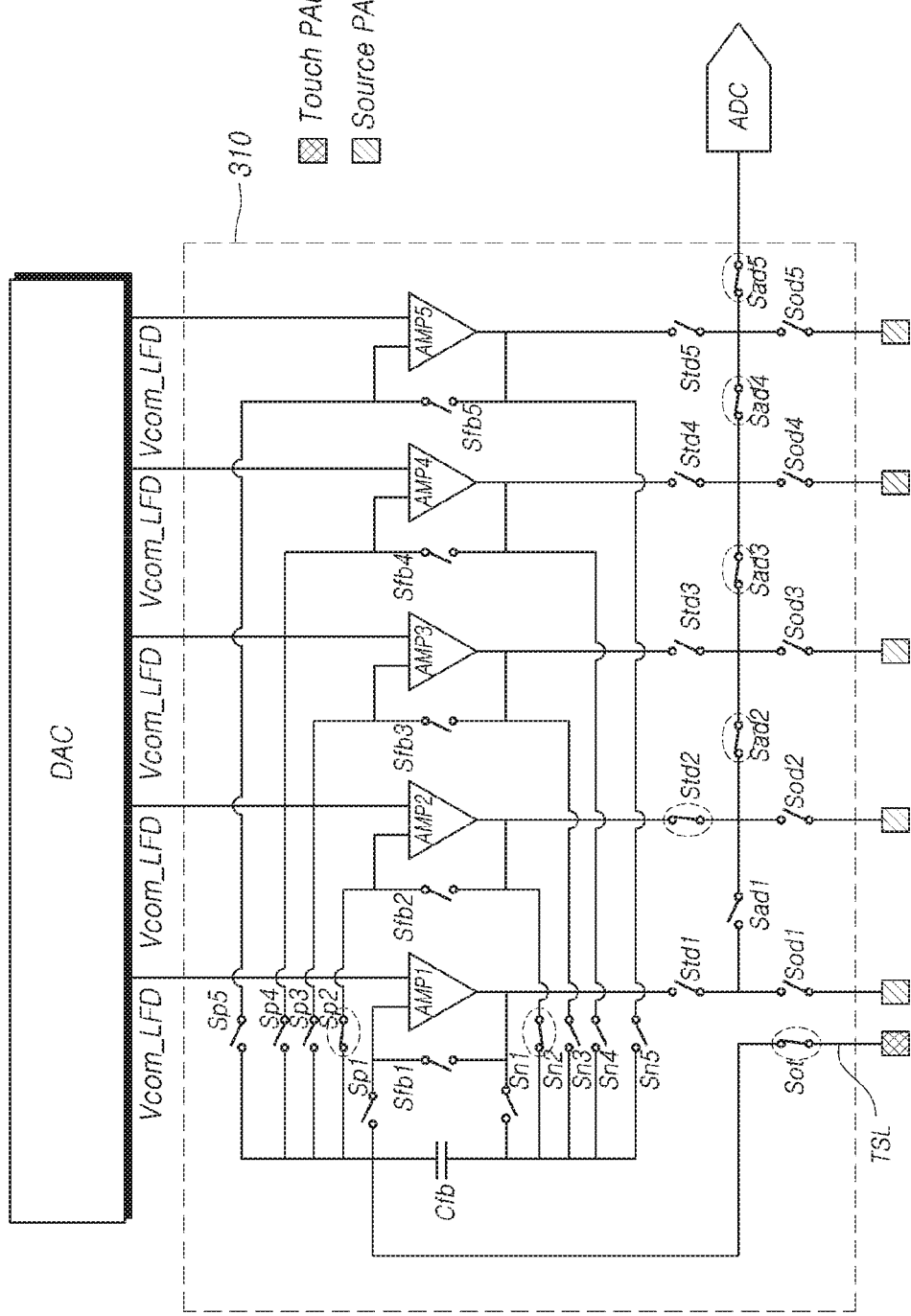

FIG. 9A and FIG. 9B illustrate examples of a state in which a switched capacitor gain amplifier group SC-GA Group 310 of the driving circuit 300 according to the second embodiment operates in a touch driving period.

Referring to FIG. 9A and FIG. 9B, each of amplifiers arranged in the switched capacitor gain amplifier group SC-GA Group 310 may be sequentially electrically coupled with a feedback capacitor Cfb that is electrically coupled with a touch sensing line TSL in the touch driving period.

Referring to FIG. 9A, a switch Sot electrically coupling the touch sensing line TSL and the feedback capacitor Cfb is turned on in the touch driving period.

Further, switches Sp1 and Sn1 electrically coupled with an amplifier AMP1 are turned on, and a switch Std1 electrically coupled with an output terminal of the amplifier AMP1 and switches Sad1, Sad2, Sad3, Sad4, and Sad5 with the analog-to-digital converter ADC are turned on.

A switch Sfb1 electrically coupled with the amplifier AMP1 dynamically operates to reset the feedback capacitor Cfb, and all of the remaining switches are turned off.

Accordingly, a touch sensing signal TSS received through the touch sensing line TSL is transferred to the analog-to-digital converter ADC via the amplifier AMP1.

After the touch sensing signal TSS is transferred through the amplifier AMP1, amplifiers AMP2, AMP3, AMP4, and AMP5 may be sequentially electrically coupled with the feedback capacitor Cfb.

Referring to FIG. 9B, a switch Sot electrically coupling a touch sensing line TSL and the feedback capacitor Cfb is turned on in the touch driving period.

Further, in the touch driving period, switches Sp2 and Sn2 electrically coupled with an amplifier AMP2 are turned on, and a switch Std2 electrically coupled with an output terminal of the amplifier AMP2 and switches Sad2, Sad3, Sad4, and Sad5 electrically coupled with the analog-to-digital converter ADC are turned on.

A switch Sfb2 electrically coupled with the amplifier AMP2 dynamically operates to reset the feedback capacitor Cfb, and all of the remaining switches are turned off.

Therefore, touch sensing signals TSS received through the touch sensing line TSL are transferred to the analog-to-digital converter ADC through the amplifier AMP2.

Similarly, amplifiers AMP3, AMP4, and AMP5 are sequentially electrically coupled with the feedback capacitor Cfb, and the touch sensing signals TSS having passed through the respective amplifiers are transferred to the analog-to-digital converter ADC.

As described above, since the touch sensing signals TSS are transferred to the analog-to-digital converter ADC through different amplifiers, the touch processor 152 may perform touch sensing, in which the influence of an error of a touch sensing signal is minimized, by using the received touch sensing signals TSS.

For example, the touch processor 152 may perform touch sensing using an average value of N received touch sensing signals TSS, or may perform touch sensing excluding a largest deviation value and a smallest deviation value among the N touch sensing signals TSS.

As such, it may be possible to prevent the accuracy of touch sensing from being lowered due to an error of touch sensing data, by performing the touch sensing using N pieces of touch sensing data.

Further, the switched capacitor gain amplifier group SC-GA Group 310 of the driving circuit 300 according to the second embodiment may enhance the strength of the touch sensing signal TSS and transfer the enhanced touch sensing signal TSS, by causing all the amplifiers to be concurrently electrically coupled with the feedback capacitor Cfb.

Figure 10:
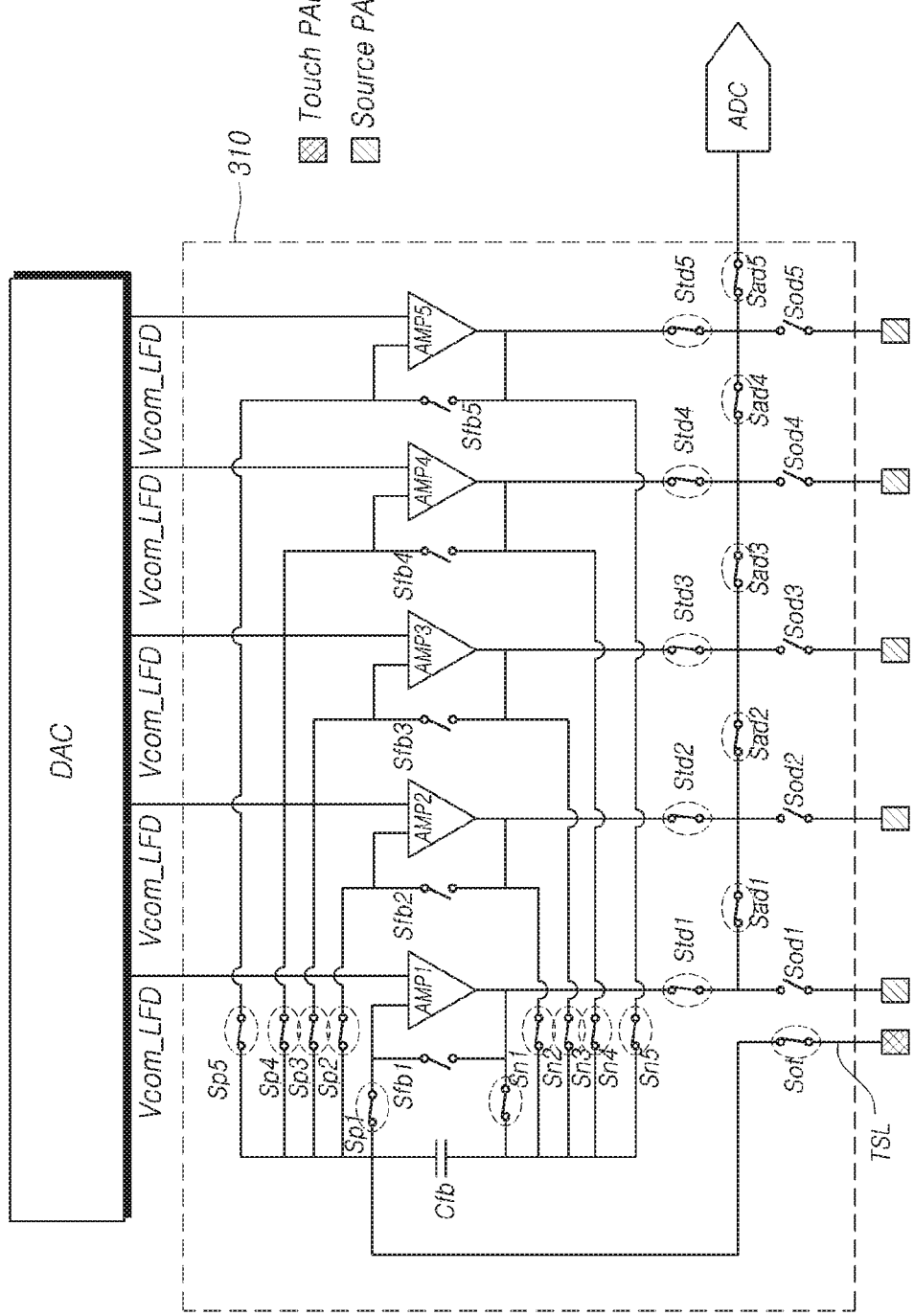
FIG. 10 is a diagram illustrating another example of a state in which the driving circuit according to the second embodiment operates in a touch driving period.

FIG. 10 illustrates another example of a state in which a switched capacitor gain amplifier group SC-GA Group 310 of the driving circuit 300 according to the second embodiment operates in a touch driving period.

Referring to FIG. 10, a switch Sot electrically coupling a touch sensing line TSL and a feedback capacitor Cfb is turned on in the touch driving period.

Further, switches Sp1 and Sn1 controlling an electrical coupling between an amplifier AMP1 and the feedback capacitor Cfb are turned on.

Further, switches Sp2 and Sn2 controlling an electrical coupling between an amplifier AMP2 and the feedback capacitor Cfb are concurrently turned on, and all switches Sp3, Sn3, Sp4, Sn4, Sp5, and Sn5 controlling electrical couplings between the remaining amplifiers AMP3, AMP4, and AMP5 and the feedback capacitor Cfb are also concurrently turned on.

Further, switches Std1, Std2, Std3, Std4, and Std5 electrically coupled to output terminals of the respective amplifiers are turned on, and switches Sad1, Sad2, Sad3, Sad4, and Sad5 electrically coupled with the analog-to-digital converter ADC are also turned on.

The switches Sfb1, Sfb2, Sfb3, Sfb4, and Sfb5 electrically coupled to the respective amplifiers operate dynamically to reset the feedback capacitor Cfb, and all of the remaining switches are turned off.

Therefore, in the touch driving period, a touch sensing signal TSS received from the touch sensing line TSL may be amplified through N amplifiers, and the N-times amplified signal may be transferred to the analog-to-digital converter ADC.

As such, the strength of the touch sensing signal TSS may be enhanced depending on the number of amplifiers electrically coupled to the feedback capacitor Cfb, thereby improving the performance of touch sensing.

The driving circuit 300 according to the present embodiments reduces a chip size and power consumption via a structure of sharing a channel for outputting a data voltage and a channel for receiving a touch sensing signal TSS, and improves the performance and the accuracy of touch sensing through ON/OFF control of the switches that may be used to electrically couple the amplifiers and the feedback capacitor Cfb.

Furthermore, a circuit configuration for touch sensing may be further reduced by generating a load-free driving voltage output in the touch driving period by using some amplifiers and the digital-to-analog converter (DAC) in the driving circuit 300.

Figure 11:
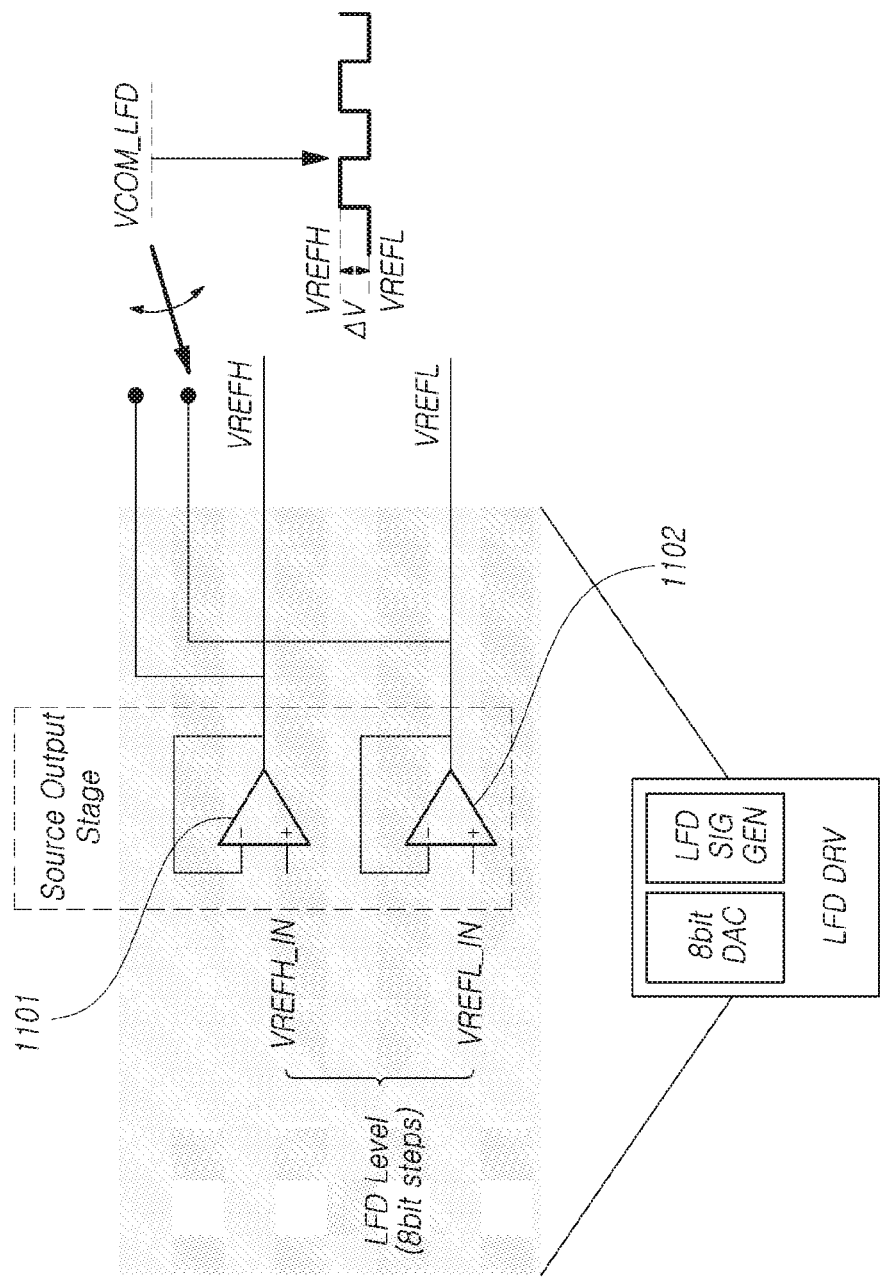
FIG. 11 is a diagram illustrating a structure in which a load-free driving voltage is generated in a driving circuit according to the present embodiments.

FIG. 11 schematically illustrates a structure in which a load-free driving voltage is generated in a driving circuit 300 according to the present embodiments.

Referring to FIG. 11, the driving circuit 300 according to the present embodiments may generate a load-free driving voltage by using the digital-to-analog converter DAC and two amplifiers arranged in the driving circuit 300.

The driving circuit 300 may generate a load-free driving voltage using a first voltage VREFH IN and a second voltage VREFL IN, which are output from the digital-to-analog converter DAC and have different voltage levels.

For example, the first voltage VREFH IN of 7V and the second voltage VREFL IN of 4V, which are output from an 8-bit digital-to-analog converter DAC, may be used.

The first voltage VREFH IN output from the digital-to-analog converter DAC is input to a first amplifier 1101 and the second voltage VREFL IN is input to a second amplifier 1102.

The first voltage VREFH and the second voltage VREFL may be output through the first amplifier 1101 and the second amplifier 1102, respectively, and one of the voltages output through the first amplifier 1101 and the second amplifier 1102 may be output in accordance with a timing of a load-free driving voltage output in a touch driving period, so that the load-free driving voltage may be generated.

The driving circuit 300 applies the generated load-free driving voltage to input terminals of the respective amplifiers arranged in a switched capacitor gain amplifier group SC-GA Group 310 of the driving circuit 300.

Therefore, the driving circuit 300 generates a load-free driving voltage output in the touch driving period, by using the amplifiers and the digital-to-analog converter DAC within the driving circuit 300 without additionally arranging a circuit for generating the load-free driving voltage, so as to further decrease a circuit structure for touch driving.

According to the present embodiments, it is possible to reduce a chip size and power consumption while enabling display driving and touch sensing, through a structure of a switched capacitor gain amplifier group SC-GA Group 310 in which switches and a feedback capacitor Cfb are electrically coupled to amplifiers arranged in output terminals of data voltage in the driving circuit 300.

In addition, the present embodiments provide the driving circuit 300 capable of improving the accuracy and performance of touch sensing by enhancing the strength of a touch sensing signal TSS or minimizing the influence of an error of the touch sensing signal TSS through ON/OFF control of switches electrically coupling amplifiers and a feedback capacitor Cfb.

Further, an advantage is conferred in that a circuit structure required for touch driving may be further simplified by generating a load-free driving voltage output in the touch driving period using amplifiers and a digital-to-analog converter DAC within the driving circuit 300.

Although a preferred embodiment of the present invention has been described for illustrative purposes, those skilled in the art will appreciate that various modifications, additions and substitutions are possible, without departing from the scope and spirit of the invention as disclosed in the accompanying claims. Therefore, exemplary embodiments of the present invention have been described for the sake of brevity and clarity. The scope of the present invention shall be understood on the basis of the accompanying claims in such a manner that all of the technical ideas included within the scope equivalent to the claims belong to the present invention.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

What is claimed is:

1. A touch display device comprising:
   a touch display panel having a plurality of gate lines, a plurality of data lines, a plurality of subpixels, a plurality of touch electrodes, and a plurality of touch sensing lines electrically coupled with the touch electrodes; and
   a driving circuit configured to drive the data lines in a display driving period, and drive the touch sensing lines in a touch driving period, the driving circuit further including a plurality of amplifiers having input terminals thereof electrically coupled with an output terminal for outputting an analog voltage, and at least one amplifier among the plurality of amplifiers being electrically coupled with a feedback capacitor electrically coupled with at least one of the touch sensing lines through at least one switch turned on in the touch driving period, and
   at least one amplifier among the plurality of amplifiers having an output terminal which is electrically coupled with the data line in the display period and electrically coupled with an analog digital convertor in the touch driving period.

2. The touch display device of claim 1, wherein the plurality of amplifiers are configured such that N adjacent amplifiers constitute a single group and one amplifier of the N amplifiers included in the group is electrically coupled with the feedback capacitor.

3. The touch display device of claim 1, wherein the plurality of amplifiers are configured such that N adjacent amplifiers constitute a single group, and the N amplifiers included in the group are electrically coupled with the feedback capacitor through one or more switches that electrically couple with the respective amplifiers and are turned on in the touch driving period.

4. The touch display device of claim 3, wherein the N amplifiers are sequentially electrically coupled with the feedback capacitor in the touch driving period.

5. The touch display device of claim 3, wherein the N amplifiers are concurrently electrically coupled with the feedback capacitor in the touch driving period.

6. The touch display device of claim 1, wherein the amplifier electrically coupled with the feedback capacitor is configured to output a data voltage in the display driving period, and to output a touch sensing signal that is input through the touch sensing lines in the touch driving period.

7. The touch display device of claim 1, wherein the driving circuit is configured to further include a first amplifier having an input terminal thereof to which a first voltage is input, and a second amplifier having an input terminal thereof to which a second voltage is input, wherein a load-free driving voltage that is output in the touch driving period is generated using voltage output from the first amplifier and voltage output from the second amplifier.

8. The touch display device of claim 7, wherein the load-free driving voltage is configured to be applied to input terminals of the plurality of amplifiers included in the driving circuit in the touch driving period.

9. The touch display device of claim 1, wherein the driving circuit is configured to further include:
   an integrator configured to integrate a signal output from the amplifier electrically coupled with the touch sensing lines and to output an integrated value; and an analog-to-digital converter configured to convert the integrated value output from the integrator into a digital signal and output the digital signal.

10. A driving circuit comprising:
an analog voltage output unit configured to receive an input of a digital signal and to output an analog voltage;
a plurality of amplifiers having input terminals thereof electrically coupled with an output terminal of the analog voltage output unit; and
a feedback capacitor electrically coupled with a touch sensing line disposed in the touch display panel, and electrically coupled with at least one amplifier among the plurality of amplifiers through at least one switch turned on in a touch driving period, and
at least one amplifier among the plurality of amplifiers having an output terminal which is electrically coupled with a data line in a display driving period and electrically coupled with an analog digital convertor in the touch driving period.

11. The driving circuit of claim 10, wherein the plurality of amplifiers are configured such that N adjacent amplifiers constitute a single group, one feedback capacitor being disposed in each group.

12. The driving circuit of claim 11, wherein the feedback capacitor is configured to be electrically coupled with one amplifier of the N amplifiers through a switch turned on in the touch driving period.

13. The driving circuit of claim 11, wherein the feedback capacitor is configured to be electrically coupled with each of the N amplifiers through a switch turned on in the touch driving period.

14. The driving circuit of claim 13, wherein the feedback capacitor is configured to be sequentially electrically coupled with the N amplifiers in the touch driving period.

15. The driving circuit of claim 13, wherein the feedback capacitor is configured to be concurrently electrically coupled with the N amplifiers in the touch driving period.

16. The driving circuit of claim 10, further comprising a load-free driving voltage generation unit configured to include: a first amplifier electrically coupled with an output terminal of the analog voltage output unit, and to which a first voltage is input; and a second amplifier electrically coupled with the output terminal of the analog voltage output unit, and to which a second voltage is input, wherein a load-free driving voltage that is output in the touch driving period is generated using voltage output from the first amplifier and voltage output from the second amplifier.

17. The driving circuit of claim 10, further comprising:
an integrator configured to integrate a signal output from the amplifier electrically coupled with the touch sensing line and output an integrated value; and
an analog-to-digital converter configured to convert the integrated value output from the integrator into a digital signal and output the digital signal.

18. A touch display device comprising:
a touch display panel having a plurality of gate lines, a plurality of data lines and a plurality of subpixels, a plurality of touch electrodes, and a plurality of touch sensing lines electrically coupled to the touch electrodes; and
a driving circuit driving the data lines with a data voltage during a display driving period, and driving the touch sensing lines with a touch driving signal during a touch driving period,
a plurality of amplifiers in the driving circuit, each of the plurality of amplifiers having input terminals thereof electrically coupled with an output terminal that outputs an analog voltage;
a feedback capacitor coupled to the output terminal of the at least one amplifier via a switch during the touch driving period; and
at least one amplifier among the plurality of amplifiers is used to output a data voltage during the display driving period and to output a touch driving signal during the touch driving period.

19. The touch display of claim 18 further including a first switch to electrically connect the output terminal of the at least one amplifier with the data line during the display period and a second switch to electrically coupled the output terminal with an analog digital convertor in the touch driving period.

* * * * *